Figure 1:
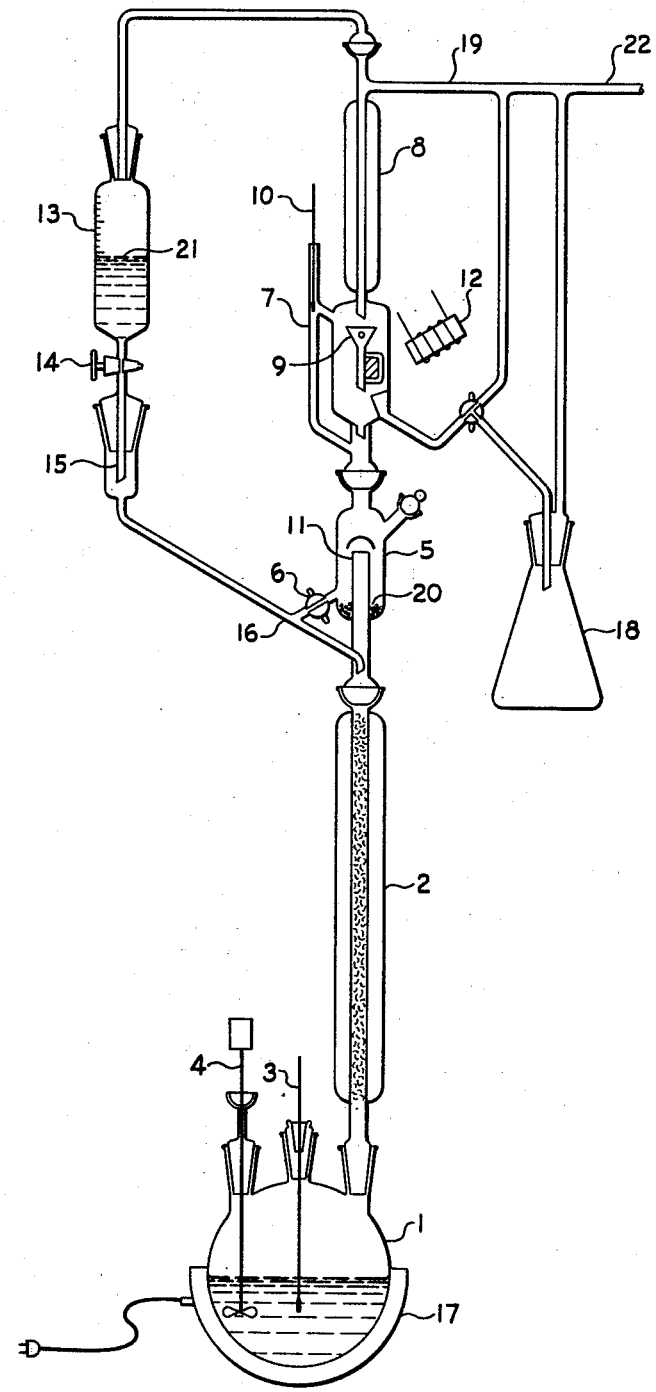

United States Patent Office 3,155,457
Patented Nov. 3, 1964

3,155,457
PURIFICATION OF THIONYL CHLORIDE
Karl E. Kunkel, Grand Island, N.Y., assignor to Hooker Chemical Corporation, Niagara Falls, N.Y., a corporation of New York
Filed Nov. 16, 1961, Ser. No. 152,885
6 Claims. (Cl. 23—203)

This invention relates to the purification of thionyl chloride ($SOCl_2$). More particularly, the specific concept which is involved is the addition of sulfur at a critical point and time in the purification process.

Among the objects of this invention is the provision of an efficient and economical process for purifying thionyl chloride with an inexpensive and readily available raw material, and securing at the same time a useful by-product instead of an undesirable residue. The known commercial processes use sulfur chloride as raw materials for the preparation of thionyl chloride, reacting same with chlorine, and oleum, sulfur trioxide or sulfur dioxide, according to the process selected. It is impractical to secure complete reaction of the sulfur chlorides, and hence almost all crude thionyl chloride contains sulfur chlorides as contaminants, in addition to sulfur dioxide, sometimes sulfuryl chloride, and residual quantities, typically five to five hundred parts per million, of combined antimony resulting from the use of antimony compounds as catalysts in the preparation of thionyl chloride. The subject invention therefore provides a process of wide application and usefulness.

This invention is concerned primarily with the removal of the sulfur chlorides. Sulfur dioxide and sulfuryl chloride may be removed by standard distillation procedures, or by known chemical means, and have little effect, either favorable or unfavorable on the subject process.

In the purification of thionyl chloride contaminated with any of the sulfur chlorides, it is impractical to obtain a product completely free of sulfur dichloride by distillatione alone. Higher chlorides of sulfur dissociate to form sulfur dichloride at or below distillation temperatures. The following equilibrium reactions are set up in a system containing sulfur chlorides:

(1)     $2SCl_2 \rightleftharpoons S_2Cl_2 + Cl_2$
(2)     $S_2Cl_2 \rightleftharpoons SCl_2 + S$ Now in a fractional distillation system one would normally expect to remove sulfur dichloride in the low boiling portion of the distillate, since it boils at approximately twenty degrees below the boiling point of thionyl chloride, and indeed gross concentration of sulfur dichloride may be reduced by this means. However, reaction 1 above, although it proceeds slowly, provides a means whereby at least part of the sulfur dichloride is converted to sulfur monochloride at the top of the column, and the removal of chlorine with the distillate prevents establishment of equilibrium. Sulfur monochloride, boiling at approximately sixty degrees higher than the boiling point of thionyl chloride, would be expected to remain in the still pot, or at least near the bottom of the column. This in fact it does, but reaction 2 above, which proceeds at a moderate rate, provides a supply of sulfur dichloride which escapes up the column. It has thus been found that complete purification by distillation alone is very tedious, requiring separate distillation steps to remove gross quantities of sulfur dichloride and sulfur monochloride, followed by operation at total reflux until all the residual sulfur chlorides are decomposed to chlorine and sulfur. The chlorine escapes out the condenser vent, and the sulfur remains in the pot. Decomposition of the thionyl chloride itself may occur during such a prolonged process, resulting in a loss of yield, and hampering complete purification.

Thionyl chloride is known to dissociate according to the reaction:

(3)     $2SOCl_2 \rightleftharpoons SO_2 + Cl_2 + SCl_2$

This also is an equilibrium reaction which proceeds slowly at distillation temperatures, but because of the removal of sulfur dioxide and chlorine during distillation, continues to form sulfur dichloride. Certain substances, typically carbon or the antimony chloride may catalyze this reaction.

A number of organic materials have been used to react selectively with the sulfur chlorides. Typical of these are toluene, monochlorobenzene, and linseed oil, each of which has certain inherent disadvantages which limit its commercial usefulness. Monochlorobenzene is relatively ineffective, and frequently fails to produce a product of satisfactory quality. Toluene is more reactive and more effective than monochlorobenzene, but its use requires extreme precaution and control to avoid loss of thionyl chloride, and to handle and dispose of the resulting by-product residues which foam readily, give off offensive fumes, and polymerize to a tar-like consistency. Linseed oil is expensive, and also produces an undesirable residue.

Additional precautions in the use or organic reagents are necessary to avoid contamination of the final thionyl chloride product with organic substance, which are undesirable for some applications of thionyl chloride. In the process of this invention the purifying agent used is sulfur, and is cheaper than any of the organic reagents named. Control of the process is much less difficult, and the risk of organic contamination of the final thionyl chloride is eliminated. The sulfur used in the present invention has none of the dangerous or highly reactive tendencies of the prior art organic purifying agents, and the reaction product instead of being an undesirable residue, is sulfur monochloride, a useful chemical which may, if desired, be used as a raw material to make more thionyl chloride.

It has been surprisingly found that if sulfur is added to the reflux stream at the top of a rectifying column in which thionyl chloride is being separated by fractional distillation from a mixture containing thionyl chloride and sulfur chlorides, the sulfur in the reflux stream effectively removes sulfur dichloride which would otherwise appear in the distillate.

The addition of sulfur to a heated mass of thionyl chloride, contaminated with sulfur dichloride, is known in the prior art. While this procedure successfully reduces gross concentrations of sulfur dichloride, it has been possible to recover only a small proportion of the thionyl chloride content of the still charge as a highly purified distillate. The reason for this is evident in the discussion of reactions 1, 2 and 3 above.

The essence and novelty of this present invention lies in the introduction of the sulfur at a time and place in the distillation process in such a manner that there is little retention time at elevated temperatures of that portion of the liquid selected for withdrawal as product, and in such a manner that the sulfur can continuously contact all the vapor throughout the period of distillation during which pure thionyl chloride is to be withdrawn.

Thus, the addition of sulfur to the reflux stream of a rectifying column in which thionyl chloride is being fractionally distilled, effectively removes sulfur dichloride, whatever its source, from the distillate. This manner of adding sulfur is not known in the prior art, nor can its performance be predicted from known properties, of the materials involved, or teachings in the prior art.

The presence of sulfur dichloride in thionyl chloride is readily detected because of its strong coloring. Pure thionyl chloride is water-white. As little as .1 percent of sulfur dichloride produces a distinct yellow discoloration, one percent is very yellow, and two percent is orangered. Any of the various laboratory colorimeters may be calibrated to give a numerical indication of the concentration of sulfur dichloride in thionyl chloride and are sensitive to as little as 0.01 percent $SCl_2$. Sulfur monochloride is much less strongly colored, and interference from this source can be minimized by proper choice of optical filters.

It is thus apparent that any reference to water-white thionyl chloride means that the sulfur dichloride content is much less than .1 percent. This provides a very rapid and sensitive means of determining the sulfur dichloride content of thionyl chloride. Uncolored impurities, such as sulfuryl chloride, do not interfere with this test method. In the analysis of the samples described in the following examples, this method was used for some of the tests, and in others it was supported by vapor phase chromatography, and by infrared spectroscopy.

The following drawing relating to the apparatus used in the process of this invention is intended to define the preferred embodiment of this invention. It is not intended however that the present invention be limited to the particulars set out in the ensuing discussion of this drawing. Many modifications will become apparent to those skilled in the art upon a reading of this disclosure, these modifications are intended to be encompassed by this invention.

FIGURE 1 is a diagrammatic representation of an apparatus used in carrying out the essence of this invention. It must be understood that the invention lies in the process, and not in the particular apparatus used to illustrate the practice of such process.

Referring to FIGURE 1, 1 is a two-liter round-bottomed flask, surmounted by a jacketed distillation column 2, three-quarters of an inch in diameter and three feet high, packed typically with one-quarter inch porcelain saddles or one-eighth glass helices. 3 is a thermometer for indicating the temperature of the contents of 1, 4 is a stirrer. All the component parts of this system are joined by means of standard ground glass joints. 5 is a chamber at the top of column 2, so arranged that it can be filled with particles of solid sulfur as at 20, and through which the reflux liquid may percolate. 6 is a stopcock for regulating the flow of such percolate back into the column by way of tube 16. That portion of the reflux which does not return to the column by way of stopcock 6 and tube 16 may overflow the top of vapor tube 11, and return by such route. 7 is a reflux splitter head, the device illustrated containing a pivoted funnel 9 which is activated by electromagnet 12 for a selected portion of a short time cycle. 10 is a thermometer to indicate the column head temperature. 8 is a water-cooled reflux condenser. 13 is a graduated dropping funnel to contain a supply of sulfur dissolved in thionyl chloride, for example as at 21, and equipped with stopcock 14 at its bottom outlet, by which means the flow of solution through dropper 15 and tube 16 is regulated. 17 is an electric heating mantle to provide heat for flask 1. 18 is a distillate receiver. 19 is a vent manifold to equalize pressure at the various component parts.

The following examples more specifically define the particulars of this invention:

*Example 1*

Seven hundred and twenty-four grams of a feed stock containing approximately seventy-five percent thionyl chloride, the balance being sulfur chlorides, was charged into the two-liter flask 1 along with seventy-nine grams of sulfur. Stirrer 4 was started to hasten dissolution of the sulfur. Approximately ten grams of solid sulfur particles were placed in chamber 5 at the top of the column. Dropping funnel 13 was empty. The charge was brought to a boil and distillate was removed at a column head temperature of seventy-seven degrees centigrade and reflux ratio of 1:4. Distillate completely free of sulfur chloride was obtained until the supply of sulfur at the top of the column was exhausted, after which the sulfur dichloride content of the distillate quickly rose to the range of one to two percent. A total of five hundred and nineteen grams of distillate was recovered, of which approximately one hundred grams was water-white thionyl chloride, entirely free of sulfur chlorides.

*Example 2*

Eleven hundred and eighty grams of the crude thionyl chloride was charged into the two-liter still pot 1. The charge was brought to a boil, and fifty-six grams of a two percent solution of sulfur in thionyl chloride was fed slowly from dropping funnel 13 through dropper 15 and tube 16 into the top of the column throughout the distillation period. Forty-one grams of foreshot, nine hundred and sixty-two grams of main cut, and one hundred and forty-one grams of residue were produced. The column head temperature was seventy-two degrees centigrade during the distillation of the foreshot and seventy-five degrees during the main cut.

Analysis of the crude, foreshot, main cut and residue is tabulated below.

| Component | Crude, percent | Foreshot | Main cut | Residue |
|---|---|---|---|---|
| $SO_2$ | 1.2 | 1.5 | 1.4 | 0.2 |
| $SCl_2$ | 0.9 | 0.1 | 0.0 | 0.3 |
| $SOCl_2$ | 83.0 | 50.3 | 83.7 | 16.2 |
| $SO_2Cl_2$ | 13.6 | 48.3 | 13.7 | 0.0 |
| $S_2Cl_2$ | 1.3 | 0.0 | 0.0 | 82.8 |

It is evident from the above tabulation that the sulfur dichloride content of the foreshot is much reduced from that of the feed stock, and that sulfur dichloride has been completely eliminated from the main cut. The presence of sulfur dichloride in the residue indicates its continued formation during the run, even though a substantial quantity of material boiling higher than sulfur dichloride has been removed. The presence of sulfur dioxide and sulfuryl chloride did not interfere with the process of purification.

*Example 3*

Twelve hundred and thirty-six grams of crude thionyl chloride, containing sixty-eight percent thionyl chloride, twenty-two percent sulfur dichloride, six percent sulfur monochloride, the remainder being other impurities, typically sulfur dioxide and antimony chlorides, were charged into the two-lifter flask 1 with one hundred and thirty-eight grams of sulfur. Twenty-nine grams of sulfur particles were placed in the chamber 5 beneath the reflux splitter 7. The charge was brought to a boil, and distillate was removed with a reflux ratio of 1:4 with the column head temperature at eventy-seven degrees centigrade. Seven hundred and sixty-eight grams of distillate, containing 99.5 percent thionyl chloride, no sulfur monochloride, no sulfur dichloride, and a total of one-half percent of all other impurities, were collected in receiver 18. This represents ninety-one percent of the thionyl chloride charged to the still pot. The remaining thionyl chloride was not lost, but remained in the still pot with the unreacted sulfur and sulfur monochloride. This residue is suitable as raw material for the preparation of more thionyl chloride by known art, and the initial thionyl chloride content is recoverable in future processing.

The addition of sulfur to the distillation pot (flask 1), removed gross quantities of sulfur dichloride from the feed stock, while the addition of sulfur at the top of the column (via chamber 5), prevented the residual sulfur dichloride, as well as that formed during the distillation, from contaminating the distillate. This illustrates the advantages to be obtained by combining the present invention with the known art, so that substantially pure thionyl chloride is obtained in a single distillation step, at a relatively low reflux ratio.

Example 4

One thousand grams of crude thionyl chloride containing approximately eighty percent thionyl chloride, ten percent sulfur dichloride and ten percent sulfur monochloride were charged into the two-liter flask 1. Twenty-five grams of powdered sulfur were added to this liquid in the flask. The stirrer 4 was started to assist in dissolving the sulfur. Heat was applied by means of the heating mantle 17 and distillation was started. Two distillate fractions were obtained in receiver 18. Chamber 15 and dropping funnel 13 were empty and were not used.

The first distillate fraction was collected at a reflux ratio of 1:1 in the column head temperature range of seventy-three to seventy-six degrees centigrade, and the second distillate fraction was collected at a reflux ratio of 1:4 in the column head temperature range of seventy-six to seventy-six and five-tenths degrees centigrade.

The results of this experiment are tabulated below.

Charged to flask 1: 1000 grams crude thionyl chloride containing approximately seventy percent $SOCl_2$, ten percent $SCl_2$ and ten percent $S_2Cl_2$. Twenty-five grams sulfur power.
Total charge: 1025 grams.

|  | Grams | Reflux Ratio | Column Head Temperature, ° C. | Percent $SCl_2$ |
|---|---|---|---|---|
| First Distillate Fraction | 469.5 | 1:1 | 73–76 | 4.4 |
| Second Distillate Fraction | 338.5 | 1:4 | 76–76.5 | 1.1 |
| Residue | 207.5 |  |  |  |
| Loss | 9.5 |  |  |  |

No distillate containing less than 1.1 percent $SCl_2$ was obtained.

The sulfur added to the still pot (flask 1), removed a portion of the sulfur dichloride, but did not remove all of it. The major portion of the residual amount was taken off in the first distillate fraction; the presence of sulfur dichloride in the second distillate fraction is evidence of its continued formation during the distillation.

Example 5

One thousand grams of crude thionyl chloride containing approximately eighty percent thionyl chloride, ten percent sulfur dichloride and ten percent sulfur monochloride were placed in the two-liter flask 1. Heat was applied by means of the heating mantle 17 and distillation was started, using total reflux until the column head attained a steady temperature of seventy degrees centigrade. Previously purified thionyl chloride containing two percent sulfur in solution was charged into the dropping funnel 13. When the column head temperature became steady at seventy degrees, this sulfur solution was started dripping slowly through the dropper 15 and tube 16 into the column 2. Three distillate fractions were collected. The data from this experiment is tabulated below.

Charged to flask 1: 1000 grams crude thionyl chloride containing 80 percent $SOCl_2$, ten percent $SCl_2$, ten percent $S_2Cl_2$.
Fed in from dropping funnel 13: 429.5 grams thionyl chloride containing two percent sulfur in solution.
Total charge: 1429.5 grams.

| Material Recovered | Weight, Grams | Reflux Ratio | Column Head Temperature, ° C. | Percent $SCl_2$ |
|---|---|---|---|---|
| First Distillate Fraction | 278.5 | 1:1 | 70–75 | 15 |
| Second Distillate Fraction | 208.0 | 1:4 | 75–76 | 1.7 |
| Third Distillate Fraction | 725.3 | 1:4 | 76–76.5 | 0.1 |
| Residue | 200.1 |  |  |  |
| Loss | 13.6 |  |  |  |

In this experiment, gross quantities of sulfur dichloride were removed by distillation, in the first and second distillate fractions, in which the sulfur dichloride was distilled from the flask 1 through column 2 faster than it could be eliminated by the sulfur fed in solution from dropping funnel 13. The low sulfur dichloride content of the third distillate fraction illustrates the removal of sulfur dichloride formed by dissociation of the sulfur monochloride and thionyl chloride during the latter portions of the distillation.

Although this invention has been illustrated and defined herein in terms of the above examples, it is to be understood that these are by no means all inclusive. Various modifications to the invention herein set forth will suggest themselves to those skilled in the art. These are intended to be comprehended within the spirit of this invention.

I claim:

1. A process for the removal from thionyl chloride of sulfur monochloride and sulfur dichloride contaminants therein which comprises fractionally distilling off thionyl chloride from sulfur monochloride contaminant at a temperature lower than the boiling point of sulfur monochloride, forming a solution of sulfur in liquid thionyl chloride and passing said solution of sulfur through gaseous thionyl chloride being distilled, to convert to liquid sulfur monochloride any sulfur dichloride from the thionyl chloride contaminants and formed during the distillation of the thionyl chloride, conducting the sulfur monochloride so formed to the liquid thionyl chloride being distilled and taking off purified distilled thionyl chloride, substantially free of sulfur dichloride.

2. A process for the removal from thionyl chloride of sulfur monochloride and sulfur dichloride contaminants therein to produce a thionyl chloride having a sulfur dichloride content less than 0.1 percent which comprises fractionally distilling off and partially refluxing thionyl chloride from sulfur monochloride contaminant at a temperature lower than the boiling point of sulfur monochloride, forming a solution of sulfur in liquid thionyl chloride and passing said solution of sulfur through the gaseous thionyl chloride being distilled to convert from the gaseous state to liquid sulfur monochloride any sulfur dichloride from the thionyl chloride contaminants and formed during the reflux distillation of the thionyl chloride, conducting the sulfur monochloride so formed with refluxing liquid thionyl chloride to the liquid thionyl chloride being distilled, condensing the thionyl chloride from which substantially all of the sulfur monochloride and sulfur dichloride have been removed and taking off purified distilled thionyl chloride containing no more than 0.1 percent of sulfur dichloride.

3. A process according to claim 1 wherein the sulfur solution is produced by passing the reflux stream of thionyl chloride through a bed of particulate, solid sulfur.

4. The process of claim 1 wherein the thionyl chloride solution of sulfur is made from previously distilled thionyl chloride in which sulfur has been dissolved.

5. The process of claim 1 wherein the contaminated thionyl chloride starting material is contaminated with about 5 to 200 parts per million, by weight, of antimony compounds.

6. The process of claim 1 in which sulfur is added to the still pot and the distillate is taken off at a temperature of 75 to 80 degrees at atmospheric pressure.

References Cited in the file of this patent

UNITED STATES PATENTS

| 939,980 | Chute | Nov. 16, 1909 |
| 2,095,857 | Carter et al. | Oct. 12, 1937 |
| 2,539,679 | Trager | Jan. 30, 1951 |

OTHER REFERENCES

Cottle: "The Purification of Thionyl Chloride," Journal of American Chemical Society, vol. 68, July 1946, pages 1380–1381.

UNITED STATES PATENT OFFICE
CERTIFICATE OF CORRECTION

Patent No. 3,155,457                                    November 3, 1964

Karl E. Kunkel

It is hereby certified that error appears in the above numbered patent requiring correction and that the said Letters Patent should read as corrected below.

Column 2, line 25, for "substance" read -- substances --; column 4, line 49, for "two-lifter" read -- two-liter --; line 54, for "eventy-seven" read -- seventy-seven --; column 5, line 10, for "15" read -- 5 --.

Signed and sealed this 18th day of May 1965.

(SEAL)
Attest:

ERNEST W. SWIDER                            EDWARD J. BRENNER
Attesting Officer                                 Commissioner of Patents